US012748262B2

(12) United States Patent
Martinez et al.

(10) Patent No.: US 12,748,262 B2

(45) Date of Patent: Sep. 29, 2026

(54) OPTICAL COUPLING DEVICE WITH A HOLOGRAPHIC DIFFRACTION STRUCTURE

(71) Applicant: COMMISSARIAT A L'ENERGIE ATOMIQUE ET AUX ENERGIES ALTERNATIVES, Paris (FR)

(72) Inventors: Christophe Martinez, Grenoble Cedex (FR); Daivid Fowler, Grenoble Cedex (FR); Quentin Wilmart, Grenoble Cedex (FR); Loïc Laplatine, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 318 days.

(21) Appl. No.: 18/543,773

(22) Filed: Dec. 18, 2023

(65) Prior Publication Data

US 2024/0201442 A1 Jun. 20, 2024

(30) Foreign Application Priority Data

Dec. 20, 2022 (FR) ..................................... 22 13928

(51) Int. Cl.
*G02B 6/34* (2006.01)
*G02B 5/32* (2006.01)

(52) U.S. Cl.
CPC .................................... *G02B 6/34* (2013.01); *G02B 5/32* (2013.01)

(58) Field of Classification Search
CPC .................................... G02B 6/34; G02B 5/32
USPC ............................................................ 385/14
See application file for complete search history.

(56) References Cited

U.S. PATENT DOCUMENTS

| | | | | |
|---|---|---|---|---|
| 5,359,686 | A | 10/1994 | Galloway et al. | |
| 5,420,953 | A | 5/1995 | Boudreau et al. | |
| 2018/0156962 | A1* | 6/2018 | Kim | G02B 6/0031 |
| 2019/0011708 | A1 | 1/2019 | Schultz et al. | |

(Continued)

FOREIGN PATENT DOCUMENTS

| | | | |
|---|---|---|---|
| FR | 2 716 268 | A1 | 8/1995 |
| WO | WO 2004/001462 | A1 | 12/2003 |
| WO | WO 2022/066461 | A1 | 3/2022 |

OTHER PUBLICATIONS

French Preliminary Search Report Issued Aug. 2, 2023 in French Application 22 13928 filed on Dec. 20, 2022 (with English Translation of Categories of Cited Documents & Written Opinion), 10 pages.

(Continued)

*Primary Examiner* — Jerry M Blevins

(74) *Attorney, Agent, or Firm* — Oblon, McClelland, Maier & Neustadt, L.L.P.

(57) ABSTRACT

An optical coupling device (100) configured to optically couple a first optical guide device (102) to a second optical guide device (104), comprising at least one first optical input-output through which the first optical guide device is intended to emit and/or receive a first light beam (103), and a second optical input-output through which the second optical guide device is intended to receive and/or emit the first light beam, further including at least one holographic diffraction structure (108) configured to guide and adapt the first light beam between the first and second optical inputs-outputs of the optical coupling device.

13 Claims, 11 Drawing Sheets

(56) References Cited

U.S. PATENT DOCUMENTS

2021/0011303 A1* 1/2021 Andreev ................ G02B 27/58

OTHER PUBLICATIONS

Saruwatari, et al., "Semiconductor laser to single-mode fiber coupler", Applied Optics, vol. 18, No. 11, Jun. 1, 1979, 10 pages.

* cited by examiner

OPTICAL COUPLING DEVICE WITH A HOLOGRAPHIC DIFFRACTION STRUCTURE

TECHNICAL FIELD

The invention relates to the photonics field, in particular integrated photonics, and is advantageously applicable for performing an optical coupling between photonic circuits obtained by different technologies, for example between a first photonic circuit based on silicon nitride and a second photonic circuit based on III-V materials. The invention could be used when assembling photonic chips on wafer or photonic chips together, to achieve optical coupling between these. For example, the invention is applicable for at least one amongst the following application: Lidar, quantum photonics, sensors, neuromorphic photonics.

PRIOR ART

Optical coupling between two photonic circuits (called "Photonic Integrated Circuit" in English, or PIC) is necessary when the two PICs cannot be manufactured together on the same wafer, or when an integration of the two PICs on the same wafer is too complex. This is the case for example between a PIC composed of III-V materials (for example with a substrate and an optical guide based on InP or AsGa) and a PIC composed of silicon (for example with a silicon substrate and an optical guide made of silicon or of SiN). For example, such an optical coupling could occur when making integrated optical systems with active components such as lasers, amplifiers or photodetectors. This optical coupling may be of the chip-to-chip, wafer-to-wafer or chip-to-wafer type.

Such an optical coupling is also necessary to connect a PIC to an optical fiber whose modes have different dimensions. For example, the diameter of the mode of a single-mode waveguide made of silicon at $\lambda$=1550 nm is about 0.5 μm while that of a single-mode fiber made of glass at $\lambda$=1,550 nm is about 10 μm. In this case, an optical coupling element performing an optical matching between the waveguide and the fiber is necessary.

It is also common that the optical modes of the guides originating from two PICs differ by their size, their geometry and their effective index. For the light to pass from one PIC to another while minimizing coupling losses, at least one amongst the two modes should be matched, or modified. This may be done through:

- conical elements ("tapers" in English) and/or with variable thickness allowing reducing or widening the modes of the transmitted light beams;
- intermediate guides, for example made of silicon and enabling passage from an InP-based guide into a SiN-based guide;
- lenses, like for example a convergent lens arranged at the fiber termination to reduce the diameter of the mode of the fiber and to approach it to that of the waveguide to which the fiber is coupled;
- SWG-type structured guides ("Sub-Wavelength Grating" in English) allowing unconfining, or enlarging, the mode of the guide and making it approach that of a fiber to which the guide is coupled;
- grating couplers ("Grating Coupler" in English, or GC) which, through a "taper" and a direction change, allow matching the size of the mode through the design of the GC;

- "Photonic Wire Bonding" in English, or PWB, consisting in creating a fiber performing this matching by polymer 3D nano-printing;
- a MOB-type device ("Micro-Optical Bench" in English) allowing coupling a laser in a waveguide through a lens, prism, mirror and GC set.

Furthermore, the optical coupling may be done:

- in "butt-coupling", or "edge-coupling", i.e. parallel to the axis of propagation of the light, as is the case for example for a lens arranged at the fiber termination or for a SWG guide;
- in adiabatic, or evanescent, fashion, vertically (with a change of the plane in which the light propagates) or laterally (the directions of propagation before and after coupling being located in the same plane), as is the case for example for a "taper".

Regardless of the performed optical coupling type, considerable alignment constraints should be complied with. For example, in the case of assembly of laser chips (for example of the VCSEL type or laser bar) on a silicon photonic wafer, the alignment should be done with an accuracy smaller than the size of the optical mode, i.e. in the range from +0.2 to +2 μm depending on the guide type and the wavelength. Guaranteeing such an alignment accuracy smaller than 20 μm requires performing an active alignment requiring measurement of the optical transmission, which is costly. In addition, the time necessary for each alignment and bonding is long (in the range of a few seconds). Finally, the losses due to the mode size difference and to misalignment are typically in the range of several dB.

DISCLOSURE OF THE INVENTION

The present invention aims to provide an optical coupling solution that is free of the alignment constraints of the optical coupling solutions of the prior art, and also limiting optical losses related to optical coupling.

For this purpose, the present invention provides an optical coupling device configured to optically couple a first optical guide device to a second optical guide device, comprising at least one first optical input-output through which the first optical guide device is intended to emit and/or receive a first light beam, and a second optical input-output through which the second optical guide device is intended to receive and/or emit the first light beam, characterized in that it further includes at least one holographic diffraction structure configured to guide and adapt the first light beam between the first and second optical inputs-outputs of the optical coupling device.

Thanks to the holographic diffraction structure ensuring optical guidance and matching of the light beam transmitted between the first and second optical inputs-outputs, the proposed optical coupling device allows improving the tradeoff between the required accuracy of alignment between the first and second optical guide devices (which is lower than that required with the solutions of the prior art), the cost of the optical coupling achieved between these optical guide devices, the efficiency of the optical coupling and its complexity.

The holographic diffraction structure used in the optical coupling device allows coupling modes with quite different sizes, with almost any orientations and originating from optical guide devices that are not accurately positioned and which could be away from another by a distance of several hundred microns, and even several millimeters.

For example, the holographic diffraction structure allows compensating for the differences between the optical modes of the two optical guide devices without using any intermediate optical element.

When the first optical guide device is intended to emit the first light beam, the second optical guide device is intended to receive the first light beam via the optical coupling device. When the second optical guide device is intended to emit the first light beam, the first optical guide device is intended to receive the first light beam via the optical coupling device.

The optical guide device emitting the first light beam may include a laser emitter element, for example a laser diode, configured to emit the first light beam towards the holographic diffraction structure.

Advantageously, the proposed optical coupling device may be used to optically couple a photonic circuit, made in the form of an active chip, with a passive optical guide device (for example a silicon or SiN based optical guide).

In a first embodiment, the optical coupling device may be such that:

- the first optical guide device is intended to emit and/or receive the first light beam at the first optical input-output of the optical coupling device according to a first direction;
- the second optical guide device is intended to receive and/or emit the first light beam at the second optical input-output of the optical coupling device according to a second direction which is not parallel to the first direction and which meets the first direction in the holographic diffraction structure;
- the holographic diffraction structure is representative of interferences intended to occur between the first light beam, when the latter is intended to be emitted in the first optical input-output of the optical coupling device according to the first direction, and a second light beam intended to be focused on the second optical input-output of the optical coupling device parallel to the second direction and which meets the first light beam in a region of the holographic diffraction structure.

In second and third embodiments, the optical coupling device may be such that:

- the first optical guide device is intended to emit and/or receive the first light beam at the first optical input-output of the optical coupling device according to a first direction;
- the second optical guide device is intended to receive and/or emit the first light beam at the second optical input-output of the optical coupling device according to a second direction;

and the holographic diffraction structure may include at least:

- a first region representative of first interferences intended to occur between the first light beam when the latter is intended to be emitted in the first optical input-output of the optical coupling device according to the first direction, and a second light beam intended to be emitted according to a third direction which is not parallel to the first direction and which meets the first light beam in the first region of the holographic diffraction structure;
- a second region, distinct from the first region and representative of second interferences intended to occur between a third light beam intended to be emitted in the second optical input-output of the optical coupling device parallel to the second direction and a fourth light beam, corresponding to a light beam conjugated (according to optics laws) with the second light beam, intended to be emitted according to a fourth direction opposite to the third direction and which meets the third light beam in the second region of the holographic diffraction structure, the second and fourth light beams being conjugate according to optics laws.

In comparison with the first embodiment, the holographic diffraction structure is herein formed of distinct first and second regions, which allows performing a more complex guidance of the first light beam, in particular when the first and second directions are not in the same plane.

In the second embodiment, the holographic diffraction structure may be formed in one single material portion.

In the third embodiment, the first region of the holographic diffraction structure may be formed in a first material portion, and the second region of the holographic diffraction structure may be formed in a second material portion distinct from the first material portion. Having a holographic diffraction structure comprising distinct regions formed in distinct material portions allows applying a modular approach for making the optical coupling device, i.e. making different portions of the optical coupling device independently of one another before assembling them to obtain the optical coupling device.

The material portion(s) including the holographic diffraction structure may include at least one photopolymer or silver halide. The use of a photopolymer to make the holographic diffraction structure is particularly advantageous since, during making of the optical coupling device, it is possible to easily record the interferences occurring within the photopolymer and which are representative of the guidance and of the optical matching to be performed by the holographic diffraction structure.

In the case where the material portion(s) including the holographic diffraction structure include(s) at least one photopolymer, the optical coupling device may further include at least one oxygen-tight material layer covering the material portion(s) including the holographic diffraction structure.

The invention also relates to an optical system comprising at least:

- an optical coupling device as described hereinabove;
- a first optical guide device intended to emit and/or receive a first light beam and optically coupled to the first optical input-output of the optical coupling device;
- a second optical guide device intended to receive and/or emit the first light beam and optically coupled to the second input-output of the optical coupling device.

Advantageously, the optical system may be such that:

- the first optical guide device comprises two first guide inputs-outputs distinct and optically coupled to the first optical input-output of the optical coupling device;
- the second optical guide device comprises two second guide inputs-outputs distinct and optically coupled to the second optical input-output of the optical coupling device.

Thus, each of the first and second optical guide devices may include two distinct optical guides, one intended for making the holographic diffraction structure and the other one for use of the optical system after making thereof.

When the optical coupling device includes the features of the previously-described first embodiment, the optical system may be such that:

- the first and second optical guide devices correspond to two photonic circuits, or to a photonic circuit and to at least one optical fiber;

the optical coupling device and the first and second optical guide devices are arranged over the same substrate.

When the optical coupling device includes the features of the previously-described second embodiment, the optical system may be such that:

the first optical guide device corresponds to a photonic circuit;

the second optical guide device includes an optical guide contained in a substrate;

the optical coupling device and the photonic circuit are arranged over the substrate.

At least one amongst the first and second optical guide devices may include a light emitter element.

The invention also relates to a method for making an optical coupling device configured to optically couple a first optical guide device to a second optical guide device, comprising at least making a holographic diffraction structure configured to guide and adapt a first light beam between first and second optical inputs-outputs of the optical coupling device, the first light beam being intended to be emitted and/or received by the first optical guide device through the first optical input-output, and being intended to be received and/or emitted by the second optical guide device through the second optical input-output.

The invention also relates to a method for making an optical system, comprising at least:

making a first optical guide device intended to emit and/or receive a first light beam, and a second optical guide device intended to receive and/or emit the first light beam;

making an optical coupling device by implementation of the above-described method.

In the first embodiment, the first and second optical guide devices may be made over a substrate such that:

the first optical guide device is intended to emit and/or receive the first light beam according to a first direction, and that the second optical guide device is intended to receive and/or emit the first light beam according to a second direction which is not parallel to the first direction and which is intended to meet the first direction in a region of the holographic diffraction structure of the optical coupling device, and the holographic diffraction structure may be obtained by implementation of the following steps:

depositing a holographic material layer over at least one region of the substrate at which the holographic diffraction structure is intended to be made;

emitting a first write light beam by the first optical guide device according to the first direction, and a second write light beam parallel to the second direction, focused on the second optical guide device and meeting the first write light beam in a portion of the holographic material layer intended to form said region of the holographic diffraction structure, forming the holographic diffraction structure which is representative of the interferences produced between the first and second write light beams, the first and second write light beams originating from the same optical source.

The optical source from which the first and second write light beams are derived is selected such that it is coherent enough to develop an interference pattern in the holographic material volume necessary to recording of the holographic diffraction structure.

Throughout the document, a holographic material refers to a photosensitive material whose characteristics allow recording a volumetric interference pattern between two light beams. For example, such a holographic material corresponds to ta photopolymer or silver halide.

In a second embodiment, the first and second optical guide devices may be made such that:

the first optical guide device is arranged over a substrate and is intended to emit and/or receive the first light beam according to a first direction, and that the second optical guide device is formed in the substrate and is intended to receive and/or emit the first light beam according to a second direction, and the holographic diffraction structure may be made by implementing the following steps:

depositing a holographic material layer over at least one region of the substrate at which a holographic diffraction structure is intended to be made;

emitting a first write light beam by the first optical guide device according to the first direction, and a second write light beam according to a third direction which is not parallel to the first direction and which meets the first write light beam in a first region of the holographic diffraction structure which is representative of the interferences produced between the first and second write light beams;

emitting a third write optical beam by the second optical guide device parallel to the second direction, and a fourth write light beam, corresponding to a light beam (optically) conjugated with the second write light beam, according to a fourth direction opposite to the third direction and which meets the third write light beam in a second region of the holographic diffraction structure which is representative of the interferences produced between the third and fourth write light beams.

In a third embodiment, the first and second optical guide devices may be made such that:

the first optical guide device is arranged over a first substrate able to be crossed by the first light beam and is intended to emit and/or receive the first light beam according to a first direction, and that the second optical guide device is formed in a second substrate able to be crossed by the first light beam and is intended to receive and/or emit the first light beam according to a second direction, and the holographic diffraction structure may be obtained upon implementation of the following steps:

depositing a first holographic material layer over at least one region of the first substrate at which a first region of the holographic diffraction structure is intended to be made, then emitting a first write light beam by the first optical guide device according to the first direction, and a second write light beam according to a third direction which is not parallel to the first direction and which meets the first write light beam in the first region of the holographic diffraction structure which is representative of the interferences produced between the first and second write light beams, forming a first portion of the optical system;

depositing a second holographic material layer over at least one region of the second substrate at which a second region of the holographic diffraction structure is intended to be made, then emitting a third write light beam by the second optical guide device parallel to the second direction, and a fourth write light beam, corresponding to a light beam conjugated with the second write light beam, according to a fourth direction opposite to the third direction and which meets the third write light beam in the second region of the holographic diffraction structure which is representative of the interferences produced between the third and fourth write light beams, forming a second portion of the optical system;

assembling the first and second portions of the optical system.

Irrespective of the embodiment, the method may further include, between making of the first and second optical guide devices and making of the holographic diffraction structure, a step of aligning and adjusting the write light beams implemented using adjustment light beams preserving the physical properties (in particular imparting no modification on the refractive index structure of the holographic material) of the holographic material layer(s) used for making the holographic diffraction structure.

Throughout the document, the term "over" is used regardless of the space orientation of the element to which this term relates. For example, in the feature "over a face of the first substrate", this face of the first substrate is not necessarily directed upwards but could correspond to a face directed according to any direction. Furthermore, the arrangement of a first element over a second element should be understood as possibly corresponding to the arrangement of the first element directly against the second element, without any intermediate element between the first and second element, or possibly corresponding to the arrangement of the first element over the second element with one or more intermediate element(s) arranged between the first and second elements.

BRIEF DESCRIPTION OF THE DRAWINGS

The present invention will be better understood upon reading the description of embodiments given or indicative and non-limiting purposes with reference to the appended drawings wherein.

Identical, similar or equivalent portions of the different figures described hereinafter bear the same reference numerals so as to facilitate passage from one figure to another.

Figure 1:
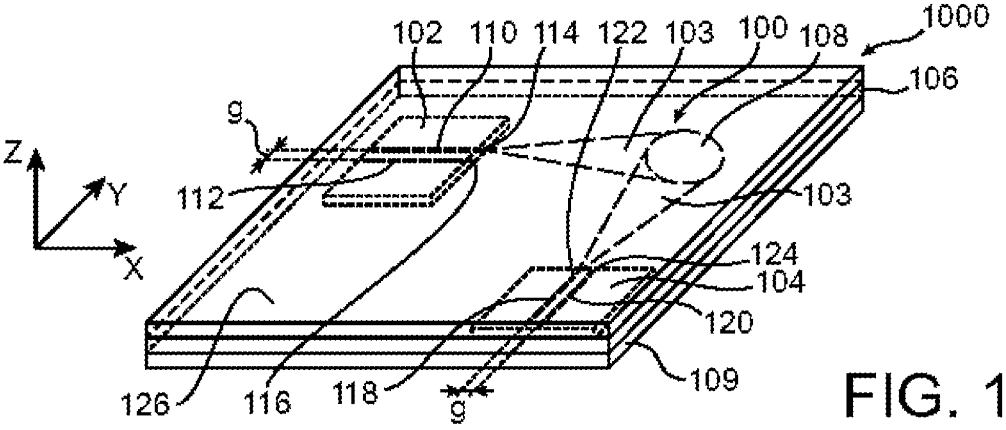
FIG. 1 illustrates an embodiment of an optical system, object of the present invention, comprising an optical coupling device, also object of the present invention, according to a first embodiment.

The different portions shown in the figures are not necessarily plotted according to a uniform scale to make the figures more readable.

The different possibilities (variants and embodiments) should be understood as not exclusive of one another and they could be combined together.

DETAILED DISCLOSURE OF PARTICULAR EMBODIMENTS

The general working principle of the optical coupling device according to the invention is firstly explained hereinbelow.

The proposed optical coupling device includes a holographic diffraction structure corresponding to a material portion in which a complex diffraction structure is recorded in 3D, in a large volume at the resolution scale of the structure. For example, the pattern resolution in this holographic diffraction structure may be smaller than 10 nm, across a material thickness comprised between 10 μm and 100 μm. This holographic diffraction structure performs an optical coupling between a first optical guide device, for example from which a first light beam is emitted, and a second optical guide device for example intended to receive this first light beam. Alternatively, this same holographic diffraction structure may also perform an optical coupling between the first and second optical guide devices and allow sending at the input of the first optical guide device the first light beam when the latter is emitted from the second optical guide device.

The holographic diffraction structure is representative of interferences occurring between at least two light beams, one called the object beam and corresponding for example to a beam emitted from the first optical guide device and, the other one called the reference beam and corresponding for example to a collimated beam on an input of the second optical guide device. These two beams are represented by fields $E_{Obj}$ and $E_{Ref}$. The superposition of the two fields $E_{Obj}$ and $E_{Ref}$ results in a total field $E_{Tot}$ defined by the following relationship:

$$E_{Tot} = E_{Obj} + E_{Ref} \tag{1}$$

The holographic diffraction structure includes a structure with an optical index replicating the intensity pattern $I_{Tot}$ of the total field $E_{Tot}$ which may be expressed by the following relationship:

$$I_{Tot} = |E_{Obj}|^2 + |E_{Ref}|^2 + E_{Obj} \times E^*_{Ref} + E_{Ref} \times E^*_{Obj} \tag{2}$$

With the fields $E_{Obj}$* and $E_{Ref}$* respectively corresponding to the conjugated object field and to the conjugated reference field. Hence, the holographic diffraction structure is an object with a phase H whose refractive index locally varies proportionally to $I_{Tot}$.

The last two cross-terms of the equation (2) hereinabove are those bearing the pattern of interference of the object beam with the reference beam. For example, if the wavelengths of the object beam and of the reference beam belong to the visible domain, and if the beams are counter-propagating, the pitch of the obtained fringes may be close to 200 nm. If the beams are co-propagating and form an angle close to 30°, the pitch of the obtained fringes may be close to 1 μm.

The equation (2) hereinabove shows that the object beam could be regenerated if the holographic diffraction structure H is illuminated, with the reference beam:

$$H \times E_{Ref} \rightarrow \left(E_{Obj} \times E^{*}_{Ref}\right) \times E_{Ref} = E_{Obj} \tag{3}$$

Similarly, it is possible to generate the different components of the write beams used to make the holographic diffraction structure (which beams are described in more details later on in the description of the method for making the optical coupling device) by illuminating the holographic diffraction structure with the adequate beams. For example, illuminating the holographic diffraction structure with the conjugated light beam of the object beam allows generating the conjugated reference beam. This may be expressed by the following equation:

$$H \times E^{*}_{Obj} \rightarrow \left(E_{Obj} \times E^{*}_{Ref}\right) \times E^{*}_{Obj} = E^{*}_{Ref} \tag{4}$$

The conjugated complex field concept may be described by the following equations which involve an amplitude and phase term:

$$E(\vec{r}) = E_A(\vec{r}) \times e^{-iE_{\varphi}(\vec{r})} \tag{5}$$

$$E(\vec{r})^{*} = E_A(\vec{r}) \times e^{iE_{\varphi}(\vec{r})} \tag{6}$$

with $E_A(\vec{r})$ corresponding to the amplitude of the field $E(\vec{r})$ and $e^{iE_{\varphi}(\vec{r})}$ corresponding to the phase of the field $E(\vec{r})$.

Since the phase term Eφ relates, in optics, to the propagation of the waves, conjugating the field of a wave is generally reflected by the invention of the direction of propagation of this wave. Thus, conjugating a divergent wave generates a convergent wave.

The holographic diffraction structure herein made allows filling simultaneously two optical functions: directing, or guiding, or steering (these three terms, related to a light beam, are indifferently used in the description), the light beam received by the holographic diffraction structure from one amongst the two optical guide devices towards the axis of propagation of the other one amongst the two optical guide devices intended to receive this light beam, for example as would have done a deflection mirror, and optically shaping, or adapting, the light beam to focus it on the optical guide device intended to receive the light beam at the input, for example as would have done an assembly of a symmetrical system comprising prisms and cylindrical lenses. In this case and throughout the description, a light beam is considered to be adapted to an optical guide device if the coupling rate of the light beam with an optical mode of the optical guide device excited by the light beam is higher than or equal to 60%, and possibly higher than or equal to 80%. For two perfectly aligned beams, the coupling rate is equal to the ratio between: (1) the square integral of the product of the normalized intensity of the light beam by the normalized intensity of the excited optical mode of the optical guide device and (2) the product of the integral of the square of the normalized intensity of the excited optical mode of the optical guide device. In the case where the beams are not aligned (angular and/or spatial offset) the coupling rate is expressed by a more complex equation set out, in the case of Gaussian beams, in the document: M. Surawatari and K. Nawata "semiconductor laser to single-mode fiber coupler", Appl. Opt., vol 18, n 11 pp 1847-1856 (1979).

For example, the first optical guide device is configured to emit the first light beam from a lateral face of the first device. The first light beam is derived from an optical mode guided inside the first device by a waveguide having a rectangular section at the lateral face. Geometries of the waveguide and of the rectangular section are such that the first light beam, so-called laser beam, has, in far field, two lobes according to two divergent directions, centered on local magnitude maxima of the laser beam. The second device comprises a single-mode waveguide having an input on a lateral face of the second device.

An embodiment of the optical coupling device, bearing the reference numeral 100, according to a first embodiment is described hereinbelow with reference to FIG. 1.

The optical coupling device 100 is configured to optically couple a first optical guide device 102 to a second optical guide device 104. The optical system comprising the optical coupling device 100, the first optical guide device 102 and the second optical guide device 104 bears the reference 1000.

The optical coupling device 100 includes at least one first optical input-output through which the first optical guide device 102 is intended to emit and/or receive a first light beam (emission of a first light beam 103 in the example of FIG. 1), and a second optical input-output through which the second optical guide device 104 is intended to receive and/or emit the first light beam (reception of the first light beam 103 in the example of FIG. 1). The optical coupling device 100 includes a so-called "holographic" material layer 106, i.e. a material in which a holographic diffraction structure 108 is made configured to guide and adapt the first light beam 103 from one amongst the first and second optical inputs-outputs of the optical coupling device 100 towards the other one amongst these first and second inputs-outputs.

In the example of FIG. 1, the first and second optical guide devices 102, 104 and the layer 106 are arranged on the same substrate 109. Furthermore, in the described example, one amongst the first and second optical guide devices 102, 104 includes a light emitter element. For example, the first optical guide device 102 may correspond to a first photonic circuit made in the form of a laser chip based on a III-V material and emitting the first light beam 103, and the second optical guide device 104 may correspond to a second photonic circuit made in the form of an optical guiding chip based on SiN.

In the embodiment shown in FIG. 1, the first optical guide device 102 includes two distinct optical guide devices 110, 112. The first optical guide device 102 includes two guide inputs-outputs 114, 116, arranged over a first lateral face of the first optical guide device 102, each associated with one amongst the two optical guides 110, 112. The optical guides 110, 112 are able to emit and/or receive identical digital opening beams with equal sizes at the guide inputs-outputs 114, 116, but not necessarily polarized in the same manner. For example, the optical guides 110, 112 are made of the same materials and are generally identical. The two guide inputs-outputs 114, 116 are optically coupled to the first optical input-output of the optical coupling device 100 which is formed by the material of the layer 106 arranged against these two guide inputs-outputs 114, 116. Similarly, the second optical guide device 104 includes two distinct optical guides 118, 120 and two guide inputs-outputs 122, 124, arranged over a second lateral face of the second optical guide device 102, each associated with one amongst the two optical guides 118, 120. The optical guides 118, 120 are capable of emitting and/or receiving beams with identical numerical apertures and with equal sizes at the guide inputs-outputs 122, 124, but not necessarily polarized in the same manner. For example, the optical guides 118, 120 are made of the same materials and are geometrically identical. As shown in FIG. 1, the layer 106 preferably has an interface with each of the first and second lateral faces, the layer 106 covers for example the first and second optical guide devices 102, 104. The two guide inputs-outputs 122, 124 are optically coupled to the second optical input-output of the device 100 which is formed by the material of the layer 106 arranged against these two guide inputs-outputs 122, 124. The two inputs-outputs 114 and 122 are positioned so that the first light beam 103 is coupled to either one of these inputs-outputs 114, 122 when the holographic structure is recorded using the inputs-outputs 116, 124. In the example of FIG. 1, the distance between the first optical guide device 102 and the holographic diffraction structure 108 is equal to that between the second optical guide device 104 and the holographic diffraction structure 108.

The optical guides 110 and 118, called for example operation guides, are intended to be user when the optical system 1000 is used to transmit the first light beam 103 from one of the optical guide devices 102, 104 to the other, and the optical guides 112, 120, called for example write guides, are intended to be used when making the optical coupling device 100 (which will be detailed later on).

FIG. 1 shows the optical system 1000 during use thereof to transmit the first light beam 103 from the first guide input-output 114 of the first optical guide device 102, the emitted first light beam 103 then being guided, i.e. deflected, and focused by the holographic diffraction structure 108 on the second guide input-output 122 of the second optical guide device 104.

Within each of the first and second optical guide devices 102, 104, the value of the distance g between the write guide and the operation guide at the first and second respective lateral faces is advantageously such that g>2. λ, with λ corresponding to the wavelength of the first light beam 103 transmitted during the operation of the optical system 1000, in order to avoid crosstalk between the write guide and the operation guide of each optical guide device. For example, the distance g may be equal to 2 μm. Advantageously, the value of the distance g is also substantially smaller than the dimensions of the first light beam 103 received at the holographic diffraction structure 108 (for example in the range of one or several hundred microns, i.e. such that $g \ll \Delta\phi \cdot d_{holo}$, with Δϕ corresponding to the divergence in radians of the first light beam 103 in the plane xy visible in FIG. 1 (a plane including the direction of emission of the first light beam 103 by the first optical guide device 102, called first direction, and perpendicular to the main plane of the optical system 1000), and $d_{holo}$ corresponding to the distance between the laser guide input-output through which the first light beam 103 is emitted and the holographic diffraction structure 108. The minimum value of the distance $d_{holo}$ may be defined according to the dimensions of the optical guide devices 102, 104 to ensure access to the write guide 124 of the second optical guide device 104.

Alternatively, the first optical guide device 102 and/or the second optical guide device 104 may include only one single optical guide intended, during use of the optical system 1000, to transmit a light beam from one optical guide device to another, and, during making of the optical system 1000, to transmit the write light beams.

In the first embodiment, the first optical guide device 102 is intended to emit and/or receive the first light beam 103 at the first optical input-output of the optical coupling device 100 according to a first direction (parallel to the X axis in FIG. 1). In addition, the second optical guide device 104 is intended to receive and/or emit the first light beam 103 at the second optical input-output of the optical coupling device 100 according to a second direction (parallel to the Y axis in FIG. 1) which is not parallel to the first direction and which meets the first direction in the holographic diffraction structure 108. In the example of FIG. 1, the first light beam 103 coming out of the first optical guide device 102 is divergent. Furthermore, in the example of FIG. 1, the angle formed between the first and second directions is 90°, nonetheless the value of this angle could be different from 90°.

The holographic diffraction structure 108 is representative of interferences intended to occur between the first light beam 103 when the latter is emitted in the first optical input-output of the optical coupling device 100 according to the first direction and a second light beam focused on the second optical input-output of the optical coupling device 100 according to a third direction opposite to the second direction and which meets the first light beam 103 in a region of the holographic diffraction structure 108. This second light beam is not visible in FIG. 1 because in this figure, the optical system 1000 is illustrated when the first light beam is transmitted from the first optical guide device 102 up to the second optical guide device 104.

In this first embodiment, the holographic diffraction structure 108 is formed in one single material portion corresponding to the material of the layer 106. In the described embodiment, the layer 106 corresponds to a holographic material layer such as a photopolymer, for example the photopolymer commercialized under the name Bayfol® by the Covestro company, and the holographic diffraction structure 108 corresponds to a recorded region of the layer 106. In the case where an oxygen-sensitive photopolymer is used during the writing phase, the layer 106 is protected by a layer 126 of an oxygen-tight material covering the layer 106 and the first and second optical guide devices 102, 104, and for example comprising $SiO_2$. Alternatively, the layer 126 may correspond to a plastic film or a thin substrate of an oxygen-tight material.

The optical system 1000 may be used to guide light beams whose wavelength(s) belong(s) to the infrared domain and/or to the visible domain.

Hence, with the optical coupling device 100 according to the above-described first embodiment, coupling between the optical guide devices 102 and 104 is made at three points: a first point formed by the input-output 114, a second point formed by the diffraction structure 108, a third point formed by the input-output 122.

A method for making the optical system 1000 previously described with reference to FIG. 1 is described hereinbelow with reference to FIGS. 2 to 5.

Figure 2:
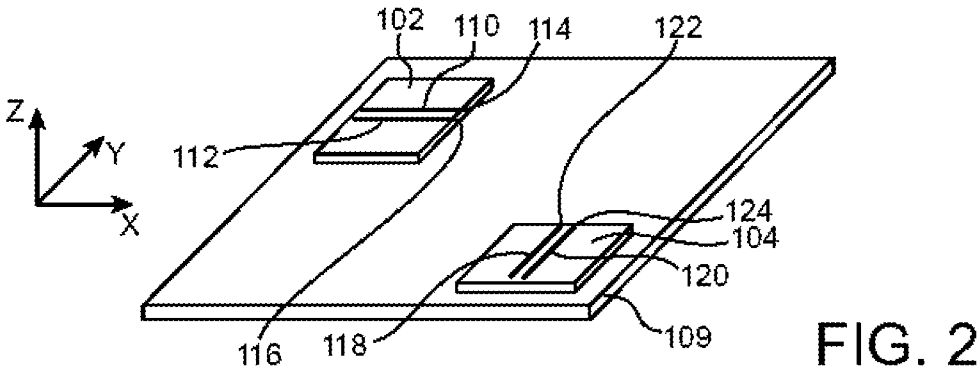
FIG. 2 to FIG. 5 illustrates the steps of a method for making an optical system, object of the present invention, comprising an optical coupling device, also object of the present invention, according to the first embodiment.

First of all, the first and second optical guide devices 102, 104 are made and/or secured, for example by adhesive, eutectic or direct gluing type bonding, on the substrate 109 (cf. FIG. 2). The first optical guide device 102 is coarsely aligned with respect to the second optical guide device 104, for example with an angular tolerance comprised between −10 degrees and +10 degrees, a translational tolerance comprised between −10 μm and +10 μm. The substrate 109 may be a wafer, for example a silicon wafer, on which several pairs of first and second optical guide devices 102, 104 are made and/or secured.

Figure 3:
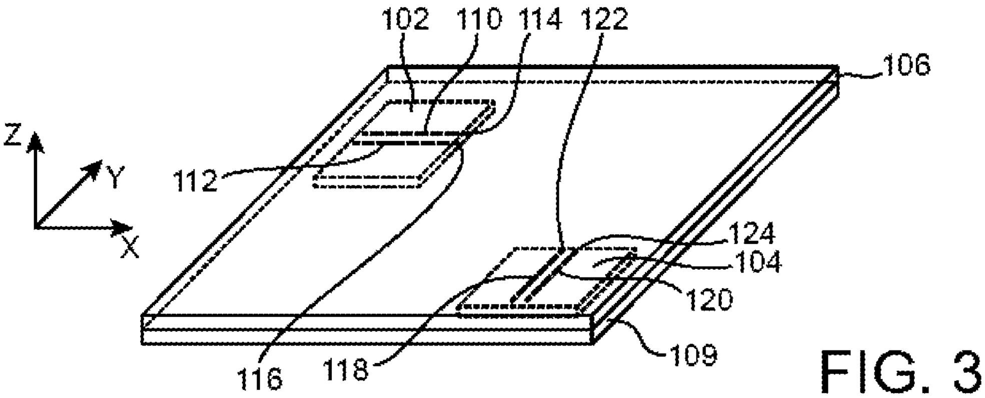
Figure 4:
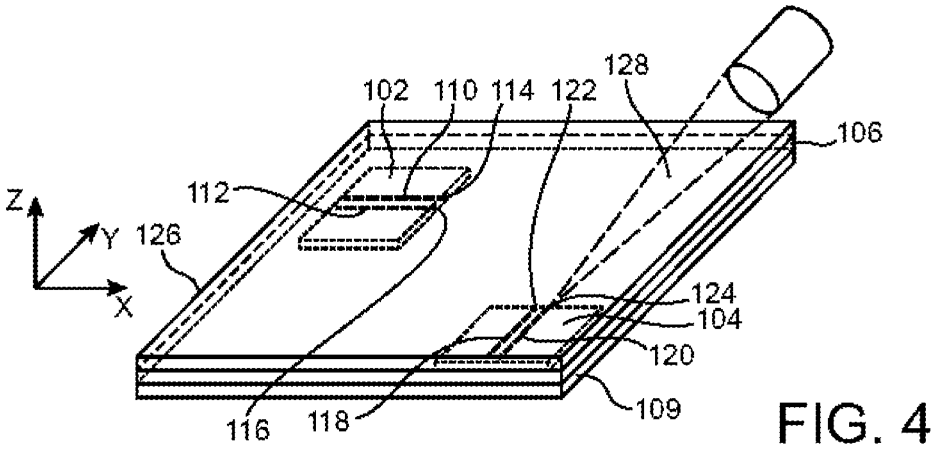
Figure 5:
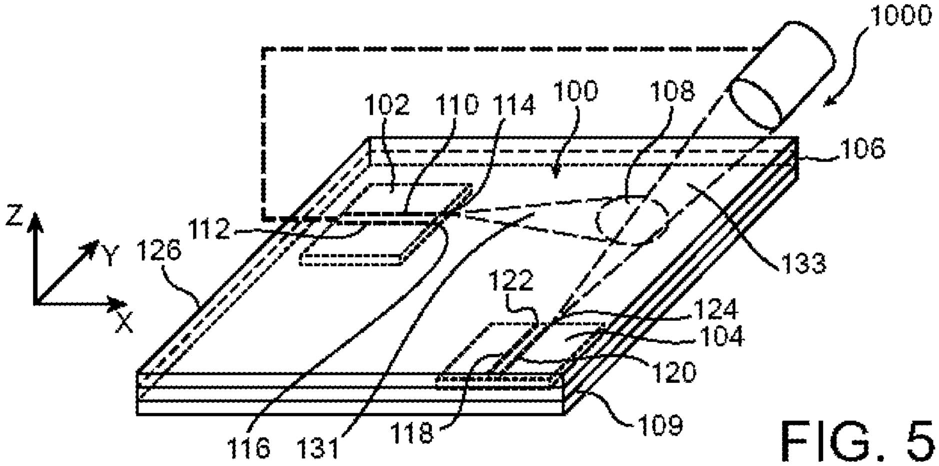

Afterwards, the material layer 106 intended to form the holographic diffraction structure 108 is deposited over the substrate 109, while also covering the first and second optical guide devices 102, 104 (cf. FIG. 3). In the described embodiment, the material of the layer 106 corresponds to a photopolymer. For example, the thickness of the layer 106 is comprised between 5 μm and 500 μm. For example, the layer 106 is deposited by implementing a spin coating ("spin coating" in English) or a drop casting ("drop casting" in English). Afterwards, the material is subjected to an air stream to remove the solvent off the resin and stiffen the layer 106.

Afterwards, the oxygen-tight material layer 126 is deposited so as to cover the layer 106.

Afterwards, an alignment and adjustment step is implemented before using the write light beams which will form the holographic diffraction structure 108. This alignment and adjustment step uses adjustment light beams 128, 129 that do not physically or chemically modify the layer 106.

First of all, a first adjustment beam 128 is aligned with the write guide 120, this is achieved when geometric characteristics of the first adjustment beam 128, such as its orientation, its size at the second lateral face, its numerical aperture, its polarization, maximize the intensity of a portion of the first adjustment beam 128 coupled to the write guide 120. Hence, the adjustment light beam is focused toward the input of the write guide 120 of the second optical guide device 104, i.e. on the guide input-output 124 (cf. FIG. 4). For example, the adjustment light beam 128 originates from an optical fiber, provided with a coupling optical system and possibly with a polarizer. For example, the alignment step is active. The light derived from the first adjustment light beam 128 coupled in the write guide 120 is then measured by a photometric circuit which could include a photodiode integrated to the second optical guide device 104 or a photodiode external to the second optical guide device 104. The write guide 120 being distinct from the operation guide 118, the photometric circuit does not disturb the second optical guide device 104 in operation. In addition, the write guide 120 being used only for writing the holographic diffraction structure 108, the photometric circuit could receive all of the coupled light of the first adjustment light beam, thus the holographic material of the layer 106 can be exposed to a reduced light power during the alignment step. The wavelength of the adjustment light beam 128 and/or its power are selected so as to be off the sensitivity range of the holographic material of the layer 106, i.e. such that the adjustment light beam 128 does not transform the material of the layer 106. For example, for a photopolymer having a photosensitiveness at a wavelength of about 532 nm (corresponding to the green color), it is possible to emit for this adjustment, a laser beam whose wavelength is about 650 nm (corresponding to the red color). Furthermore, the power of the adjustment light beam is for example 0.1 μW while a power of 0.5 μW could be necessary to transform the photopolymer. This adjustment step allows optimizing the positioning of optical elements, where appropriate, like an optical axis or a focal distance of the optical system, or an orientation of the polarizer, used without modifying the physical or chemical structure of the material of the layer 106.

Afterwards, during a second sub-step of the alignment step, the light of the source used to emit the light beam 128 is split into two portions by the beam divider. The first portion of the emitted light is always focused toward the write guide 120 of the second optical guide device 104 and continues forming the first adjustment beam 128, and the second portion of the emitted light is injected in the write guide 112 of the first optical guide device 102 in order to obtain a second adjustment light beam 129. The second alignment sub-step may also comprise an active adjustment of the beam divider using a photodiode integrated or external to the first optical guide device 102. Alternatively, the first adjustment beam 128 is shuttered during adjustment of the beam divider. Interferences occur at the intersection of the first and second adjustment light beams 128 and 129. Non-geometric characteristics of the emitted light are then modified so that the power (for example increased to a value equal to 0.5 μW), the coherence, the duration of exposure of the layer 106 and the wavelength (for example modified to a value equal to 532 nm or 850 nm) of the emitted light beams, which then correspond to write light beams (reference beam 131 originating from the first optical guide device 102 and object beam 133, in FIG. 5), enable recording of the interference pattern obtained in the material of the layer 106, that being so in order to make the holographic diffraction structure 108. Advantageously, the light used for recording the interference pattern in the material of the layer 106 is monochromatic.

Afterwards, the obtained holographic diffraction structure undergoes a treatment by exposing it to a non-coherent light beam, and possibly by subjecting it to annealing, in order to improve and stabilize its characteristics, in particular the optical index variations within the material of the holographic diffraction structure 108.

Thus, an incident light beam originating from the write guide 112 of the first optical device 102 generates a transmitted beam having the geometric characteristics of the object beam 133 and of the first adjustment beam 128, by illuminating the holographic diffraction structure 108, and therefore maximizing the intensity of a portion of the transmitted beam coupled to the write guide 120 of the second optical guide device 104. Consequently, the incident light beam is guided, i.e. directed, from the write guide 112 of the first optical device 102 towards the write guide 120 of the second optical guide device 104, meaning that a portion of the intensity of the incident beam is coupled in the write guide 120 of the second device. The incident light beam is also adapted to the write guide 120 of the second optical guide device 104, as the intensity of the portion of the coupled incident beam is maximized.

Figure 6:
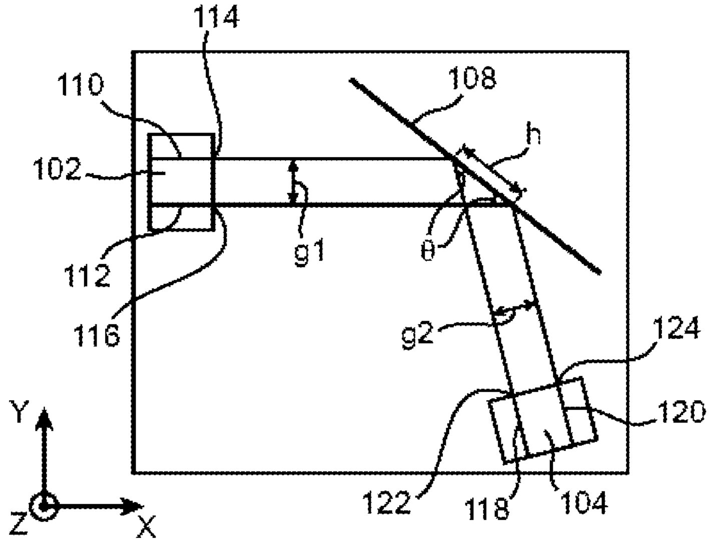
FIG. 6 schematically illustrates an operation of an optical system, object of the present invention, comprising an optical coupling device, also object of the present invention, according to the first embodiment.

The two guide inputs-outputs 114, 116 of the first optical guide device 102 are separated from one another by a distance g1 in FIG. 6, and that separating from one another the two guide inputs-outputs 122, 124 of the second optical guide device 104 is called g2 in FIG. 6. These distances are such that the beams emitted from either one of the optical guides of the first optical guide device 102 are properly guided up to the corresponding optical guide of the second optical guide device 104, as shown in FIG. 6 where the holographic diffraction structure 108 is shown in the symbolic form of a reflector mirror. The first light beam 103 interacts with the holographic diffraction structure 108 in a manner similar to the incident beam, thus the first light beam 103 is guided towards the operation guide 118 of the second optical guide device 104 and is adapted by the holographic diffraction structure 108.

Advantageously, the above-described making method may be implemented so as to collectively and simultaneously make several optical systems 1000 on the same substrate 109. Afterwards, the different optical systems 1000 may be separated from one another by cutting the substrate 109.

An embodiment of an optical system 1000 comprising an optical coupling device 100 according to a second embodiment is described hereinbelow with reference to FIG. 7. Only differences with the first embodiment are described.

Unlike the first embodiment wherein coupling between the optical guide devices 102 and 104 is therefore performed at three points, the optical coupling device 100 according to this second embodiment performs coupling at four points between the optical guide devices 102 and 104.

In the described particular embodiment, the first optical guide device 102 corresponds to a chip, for example similar to that one previously described in connection with the first embodiment, and the second optical guide device 104 includes one or more optical guide(s) directly integrated in the substrate 109.

In this second embodiment, the holographic diffraction structure 108 includes a first region 130 representative of first interferences intended to occur between the first light beam 103 when the latter is intended to be emitted from the first optical input-output of the optical coupling device 100 according to a first direction (parallel to the x axis in FIG. 7) and a second light beam intended to be emitted according to a third direction (parallel to the z axis in FIG. 7) which is not parallel to the first direction and which meets the first light beam 103 in the first region 130 of the holographic diffraction structure 108. In the example described herein, the first and third directions are substantially perpendicular with respect to one another.

The diffraction structure 108 also includes a second region 132, distinct from the first region 130 and representative of second interferences intended to occur between a third light beam intended to be emitted from the second optical input-output of the optical coupling devoice 100 parallel to the second direction and a fourth light beam intended to be emitted according to a fourth direction opposite to the third direction and which meets the third light beam in the second region 132 of the holographic diffraction structure 108. In the example described herein, the second and fourth directions are substantially perpendicular to one another.

Figure 23:
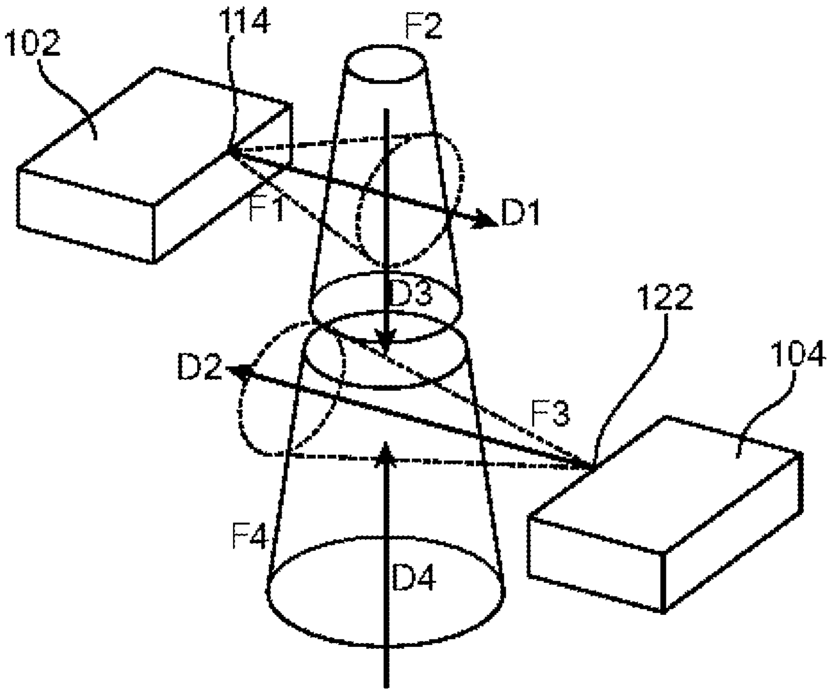
FIG. 23 schematically illustrates the light beams intended to define the light diffraction structure of the optical coupling device according to the second embodiment.

FIG. 23 schematically shows the above-described different light beams, wherein the following legends are used:

F1: first light beam;
F2: second light beam;
F3: third light beam;
F4: fourth light beam;
D1: first direction;
D2: second direction;
D3: third direction;
D4: fourth direction.

Figure 7:
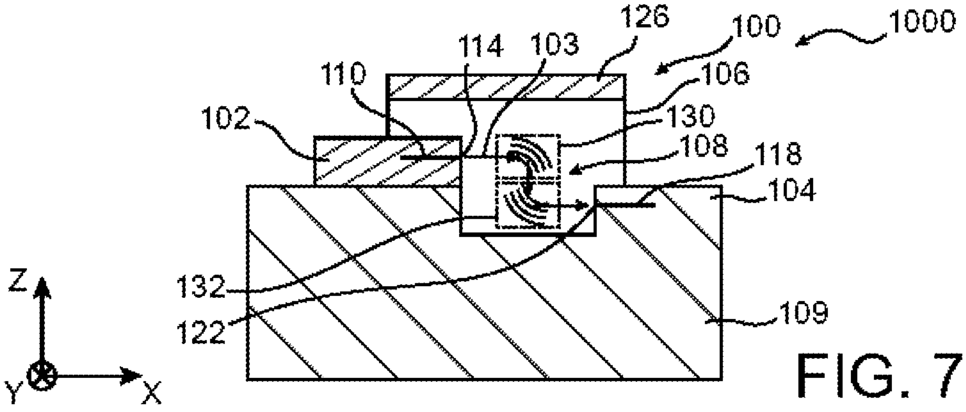
FIG. 7 illustrates an embodiment of an optical system, object of the present invention, comprising an optical coupling device, also object of the present invention, according to a second embodiment.

In FIG. 7, the regions 130, 132 are symbolically delimited by dotted lines.

In the described embodiment, each of the optical guide devices 102, 104 includes two distinct optical guides, as previously described with reference to FIG. 1 (in FIG. 7, only one of the guides of each optical guide devices 102, 104 is shown).

Thus, when using the optical system 1000, the first light beam 103 emitted from the guide input-output 114 of the first optical guide device 102 arrives in the first region 130 of the holographic diffraction structure 108, is directed by the latter in the direction of the second region 132 of the holographic diffraction structure 108 so as to be deflected and focused on the guide input-output 122 of the second optical guide device 104. In FIG. 7, the pathway followed by the first light beam 103 within the optical coupling device 100 is symbolically illustrated by arrows.

With the optical coupling device 100 according to the above-described second embodiment, the coupling between the optical guide devices 102 and 104 is therefore made at four points: a first point formed by the input-output 114, a second point formed by the first region 130 of the diffraction structure 108, a third point formed by the second region 132 of the diffraction structure 108, and a fourth point formed by the input-output 122.

In the embodiment described hereinabove with reference to FIG. 7, the first and second directions, which herein respectively correspond to the direction of emission of the first light beam 103 from the input-output 114 by the first optical guide device 102 and to the direction of reception of the first light beam 103 on the input-output 122 by the second optical guide device 104, are substantially parallel to one another. Alternatively, the first and second directions may be not substantially parallel to one another, but, for example, substantially perpendicular to one another. For example, considering the axes X, Y and Z of FIG. 7, the first direction may be substantially parallel to the X axis, the third and fourth directions may be substantially parallel to the Z axis, and the second direction may be substantially parallel to the Y axis.

Alternatively, the first light beam 103 may be emitted from the second optical guide device 104 and be focused on the guide input-output 114 of the first optical guide device 102 thanks to the holographic diffraction structure 108. The obtained pathway then corresponds to the pathway opposite to that illustrated in FIG. 7.

A method for making the optical system 1000 previously described with reference to FIG. 7 is described hereinbelow with reference to FIGS. 8 to 18. In the example described with reference to these figures, several optical systems 1000 are collectively made from the first substrate 109.

The substrate 109 includes at least one material transparent to the wavelengths of the light beams that will be used to make the holographic diffraction structures 108 of the optical systems 1000.

The second optical guide devices 104 are made in the substrate 109.

Figure 8:
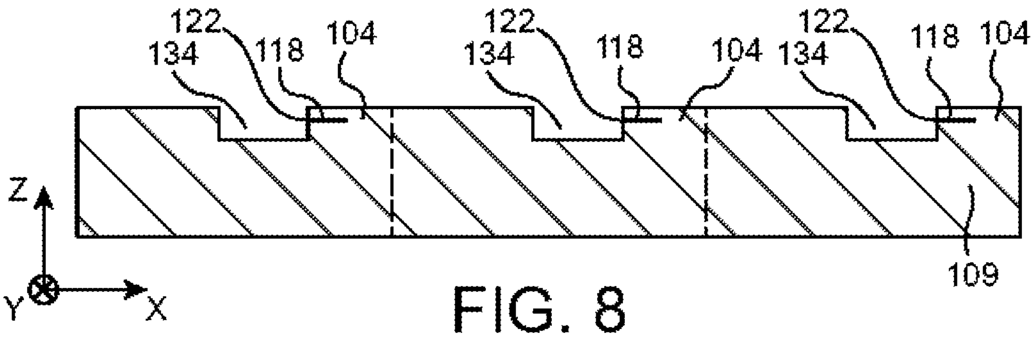
FIG. 8 to FIG. 18 illustrate the steps of a method for making an optical system, object of the present invention, comprising an optical coupling device, also object of the present invention, according to the second embodiment.

Cavities 134 are locally etched in the substrate 109 at regions in which the holographic diffraction structures 108 will be made (cf. FIG. 8). These cavities 134 are made with enough depth for the guide inputs-outputs 122, 124 of the second optical guide devices 104 to be then in contact with the material of the layer 106 in which the holographic diffraction structures 108 will be made.

Figure 9:
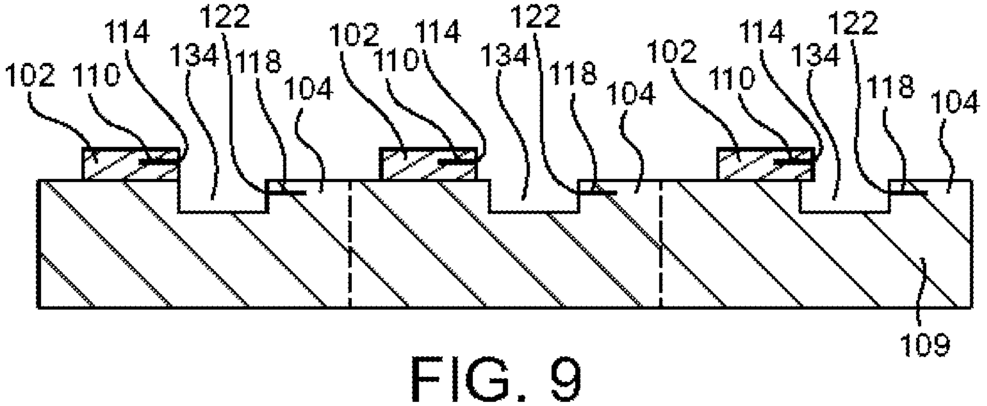

Afterwards, the first optical guide devices 102 are arranged and secured, for example by adhesive, eutectic or direct gluing type bonding on the substrate 109 (cf. FIG. 9). As shown in FIG. 9, positioning of the first optical guide devices 102 with respect to the second optical guide devices 104 is not necessarily carried out with great accuracy (an accuracy in the range of about ten microns and ten degrees could be enough) and offsets from the position of the first optical guide devices 102 with respect to their reference position are permissible.

Figure 10:
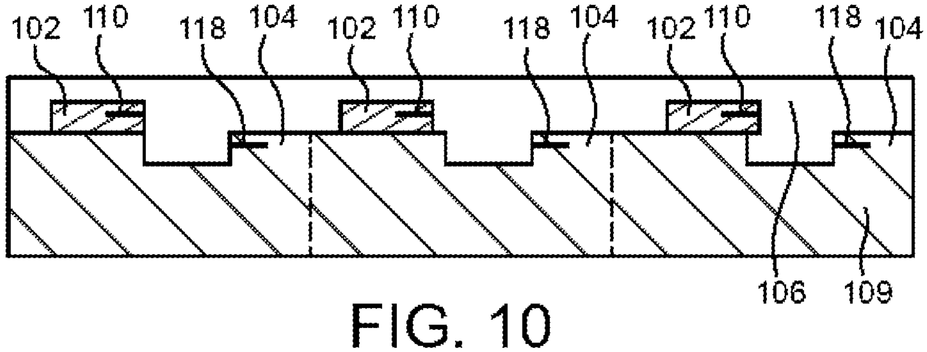

Afterwards, the layer 106 is deposited over the substrate 109 while covering the first and second optical guide devices 102, 104 (cf. FIG. 10). In particular, the material of the layer 106 fills the cavities 134 previously etched in the substrate 109. The material of the layer 106 corresponds to a photopolymer. Afterwards, the material of the layer 106 may be treated to remove from it the solvent used for deposition thereof.

Figure 11:
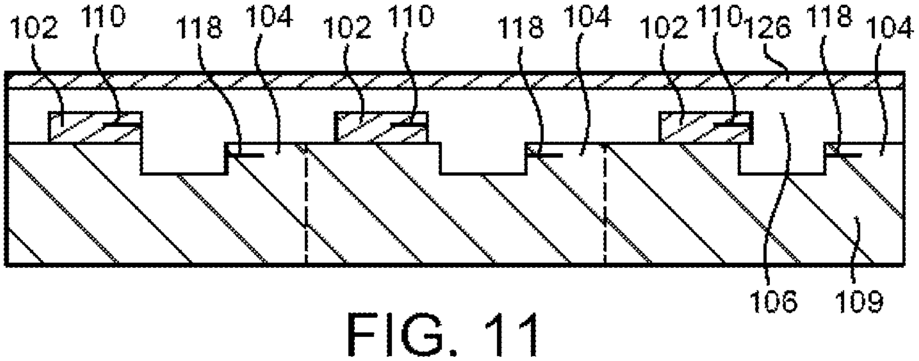

Afterwards, the oxygen-tight material layer 126 is deposited over the layer 106 (cf. FIG. 11). Like for the substrate 109, the layer 126 includes t least one material transparent to the wavelengths of the light beams which will be used to make the holographic diffraction structures 108, this material corresponding for example to $SiO_2$.

Afterwards, the steps allowing making of the holographic diffraction structures 108 are implemented. In FIGS. 12 to 15, making of one single holographic diffraction structure 108 is described and illustrated.

Figure 12:
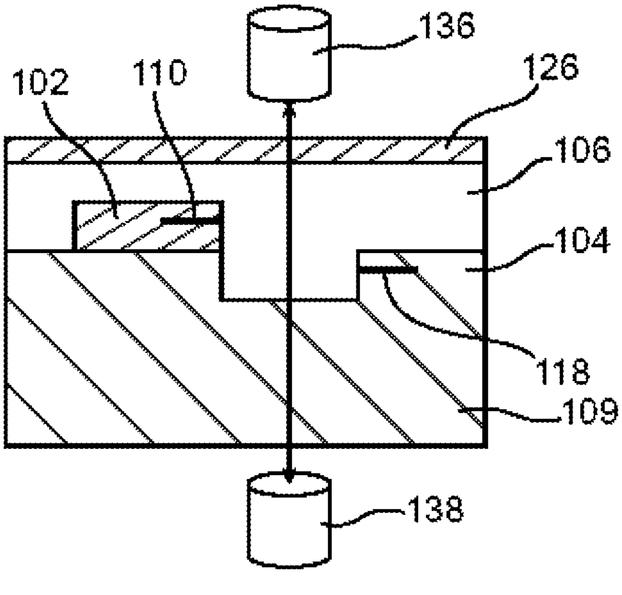
Figure 13:
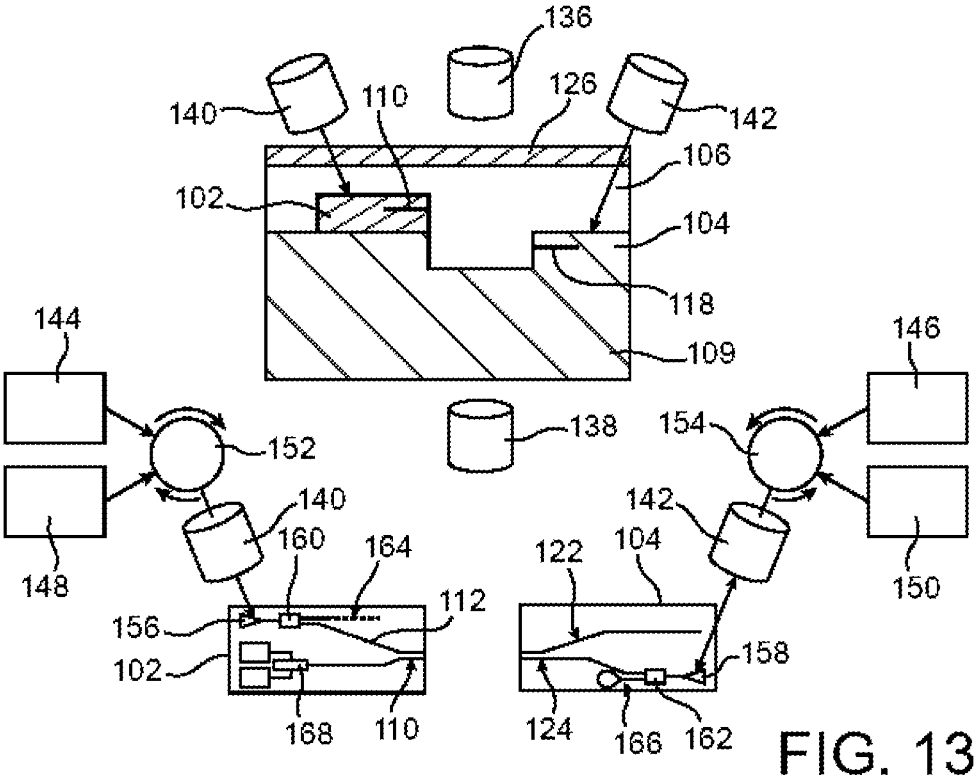
Figure 14:
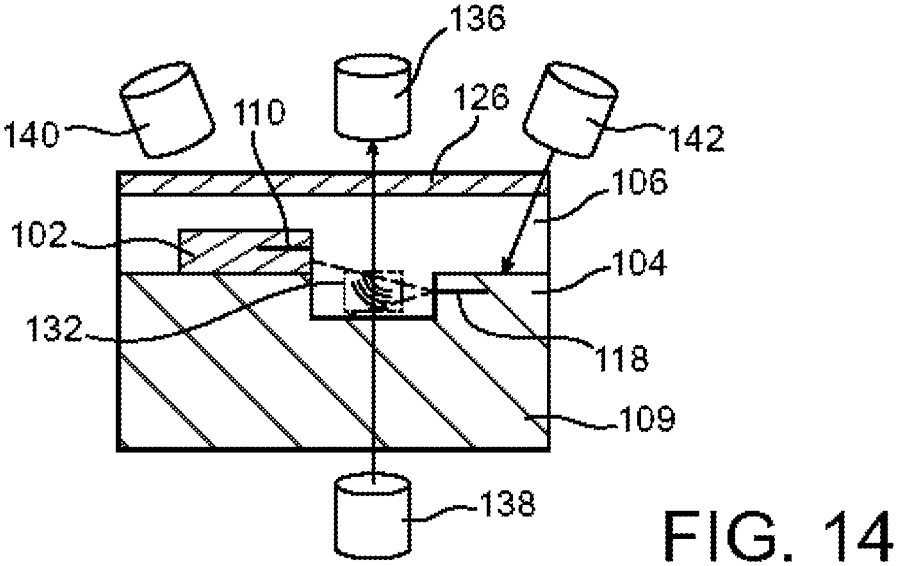

Two elements 136, 138 emitting/receiving light beams intended to meet the light emission/reception paths of the optical guide devices 102, 104 are positioned such that these light beams cross portions of the layer 106 in which the holographic diffraction structure 108 is intended to be made (cf. FIG. 12). For example, these elements 136, 138 correspond to optical fibers, and are aligned opposite one another. For example, these optical fibers are equipped with collimators, and possibly with polarizers.

Two light emission elements 140, 142 are also coupled to the first and second optical guide devices 102, 104. For example, these elements 140, 142 correspond to optical fibers to which laser emitter elements 144, 146 and optical power-meters 148, 150 are coupled via circulators 152, 154. The write guides 112, 124 of the first and second optical guide devices 102, 104 are also provided with optical reception elements 156, 158 allowing transmitting the light beams received from the elements 140, 142 in the write guides 112, 124 throughout a divider 160, 162 (for example corresponding to a multimode interferometer configured to transmit a minimum flux in the layer 106 at the adjustment wavelength and maximum at the write wavelength) and a reflector 164, 166 (corresponding to a Bragg mirror 164 and a loop 166 in the example shown in FIG. 13) sending back the light in the element 140, 142. The light sent back to the elements 140, 142 is measured by the optical power-meters 148, 150. An alignment step allows maximizing the light fluxes originating from the laser emitter elements 144, 146 received by the optical power-meters 148, 150. It should be noted that in FIG. 13, the light emitter element of the first optical guide device 102 that will be used during operation f the optical system 1000 is visible and designated by the reference 168.

After these steps of adjusting and aligning the emitter elements 136, 138, 140 and 142, each of the regions 130, 132 of the holographic diffraction structure 1008 is made. In the described example, the second region 132 is made at first by emitting, by the emitter elements 138 and 142, light beams causing the transformation of a portion of the material of the layer 106 and thus recording the interference pattern generated when the light beams emitted by these emitter elements 138, 142 meet (cf. FIG. 14). The beam emitted by the element 142 and emitted at the output of the second optical guide device 104 is called third light beam, and the beam emitted by the emitter element 138 is called fourth light beam.

Figure 15:
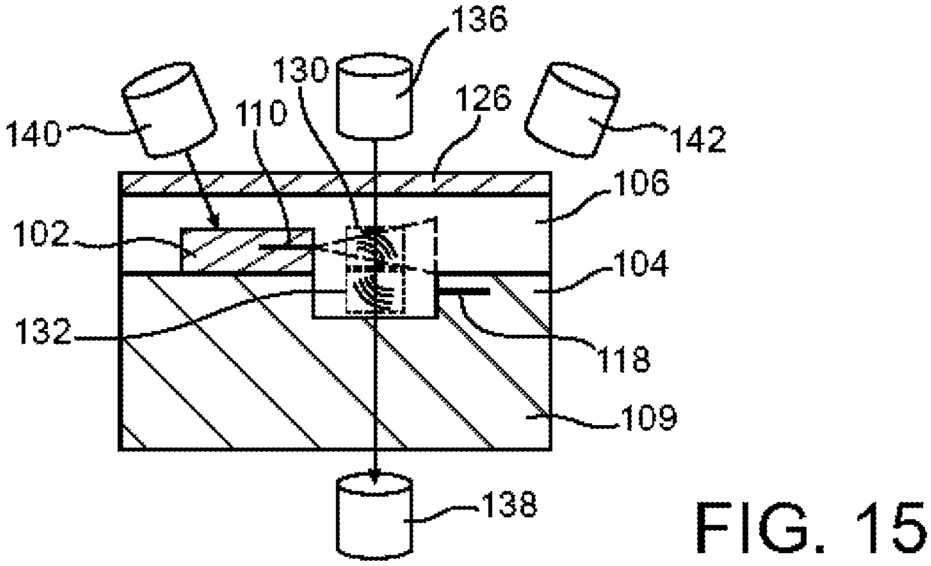

Afterwards, the first region 130 is made by emitting by the emitter elements 136, 140, light beams causing the transformation of a portion of the material of the layer 106 and thus recording the interference pattern generated when the light beams emitted by these emitter elements 136, 140 meet (cf. FIG. 15). The beam emitted by the element 140 and emitted at the output of the first optical guide device 102 corresponds to the first light beam, and the beam emitted by the emitter element 136 is called second light beam. Similarly to the first embodiment, during these two write phases, non-geometric characteristics of the light beams emitted by the emitter elements 136, 138, 140, 142 are modified to enable recording of the interference patterns in the material of the layer 106.

Preferably, the first and second regions 130, 132 of the holographic diffraction structure 108 are made sequentially in order to avoid interference phenomena other than those generating the holographic diffraction structure 108.

In the example hereinabove, the second region 132 is made before the first region 130. Alternatively, the first region 130 may be made before the second region 132.

After making of the holographic diffraction structure 108, it is possible to verify the coupling achieved by the optical coupling device 100 by emitting the first light beam from the element 140 which is transmitted to the element 142 through the first optical guide device 102, the holographic diffraction structure 108 and the second optical guide device 104. The received light beam may be measured by the optical power-meter 150 which is coupled to the element 142.

Figure 16:
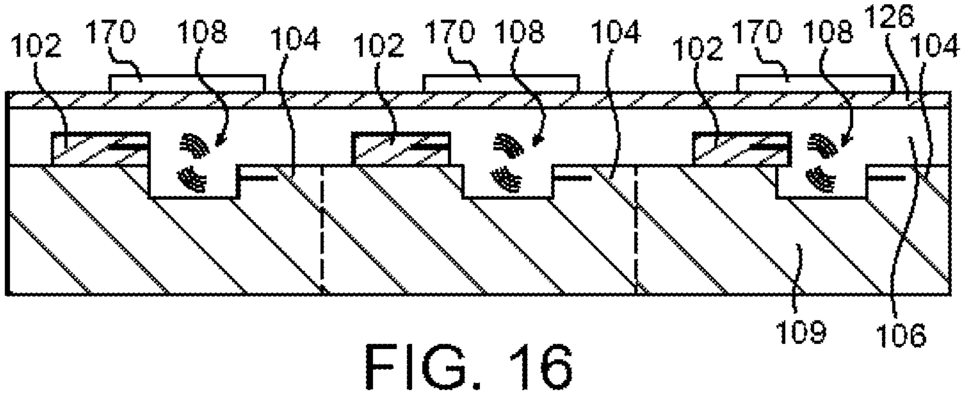

After making of the holographic diffraction structures 108, the optical systems 1000 are finished by depositing a photolithography resin 170 over the layer 126 according to a pattern defining the portions of the layers 106 and 126 to be preserved (FIG. 16).

Figure 17:
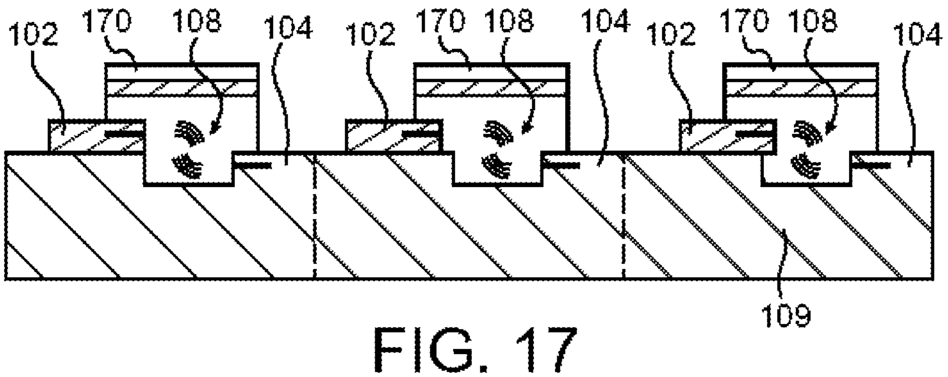

Afterwards, the layers 106 and 126 are etched according to the pattern defined by the photolithography resin 170 (FIG. 17).

Figure 18:
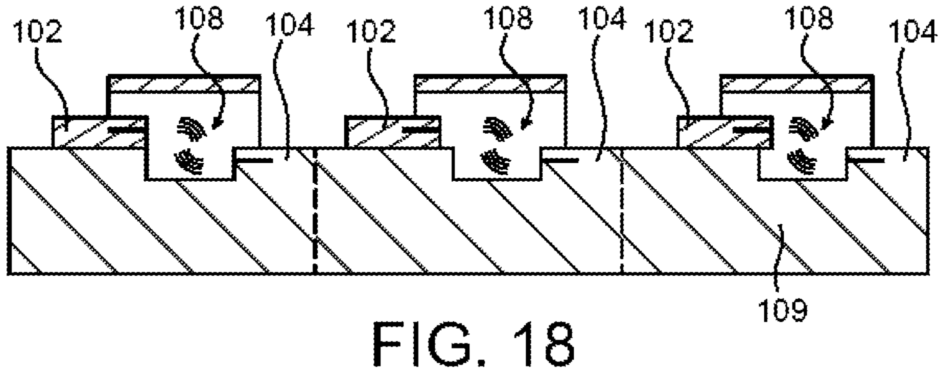

Afterwards, the resin 170 is removed (FIG. 18).

Afterwards, the substrate 109 is cut in order to individualize the different optical systems 1000 made.

Figure 19:
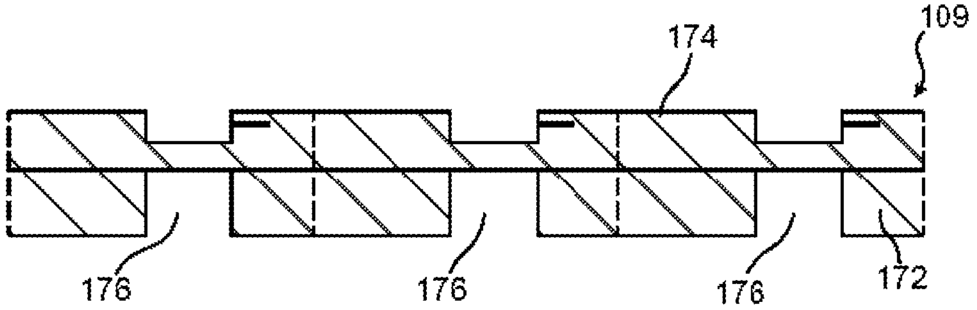
FIG. 19 illustrates a variant of a substrate that could be used for making an optical system, object of the present invention, comprising an optical coupling device, also object of the present invention, according to the second embodiment.

In the above-described embodiment, the substrate 109 includes an optically-transparent material so that it could be crossed by the light beam emitted by the element 138 when making the holographic diffraction structures 108. Alternatively, it is possible to use a substrate 109 that is not fully transparent like that one shown for example in FIG. 19 which includes a non-transparent semiconductor layer 172, for example based on silicon, over which a transparent material layer 174 is arranged, for example a buried oxide layer (for example based on $SiO_2$). Blind holes 176 are formed through the layer 172 so that the light beams emitted by the element 138 when making the holographic diffraction structures 108 reach the material of the layer 106.

Figure 20:
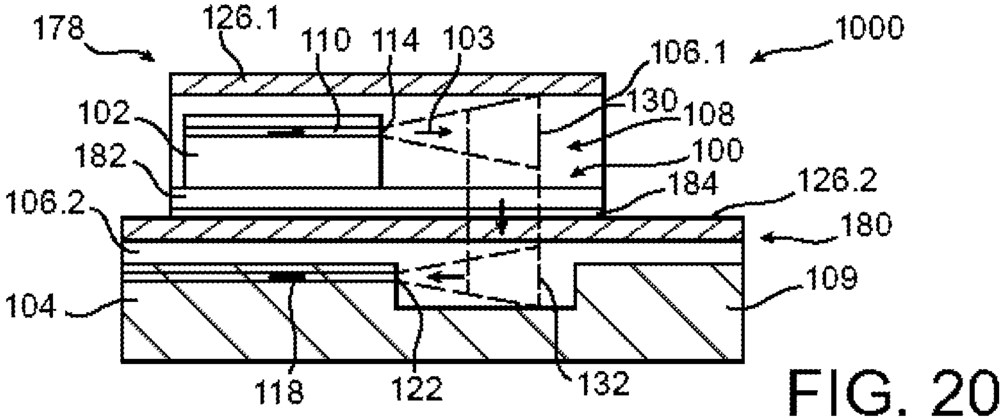
FIG. 20 illustrates an embodiment of an optical system, object of the present invention, comprising an optical coupling device, also object of the present invention, according to a third embodiment.

An embodiment of an optical system 1000 comprising an optical coupling device 100 according to a third embodiment is described hereinbelow with reference to FIG. 20. Only the differences with the second embodiment are described.

Like in the previously-described second embodiment, the optical coupling device 100 according to the third embodiment proposes a coupling between the optical guide devices 102 and 104 which is made at four points: a first point formed by the input-output 114, a second point formed by the first region 130 of the diffraction structure 108, a third point formed by the second region 132 of the diffraction structure 108, and a fourth point formed by the input-output 122. Nonetheless, unlike the second embodiment wherein the holographic diffraction structure 108 is made in only one portion of the material of the layer 106, each of the regions 130, 132 of the holographic diffraction structure 108 is made in a distinct portion of the layer 106, allowing for a modular making of the optical system 1000, i.e. making different portions of the optical system 1000 independently of one another, then assembling these different portions.

In the described embodiment, the optical system 1000 includes a first portion 178 comprising in particular the first optical guide device 102 and the first region 130 of the holographic diffraction structure 108, and a second portion 180 comprising in particular the second optical guide device 104 and the second region 132 of the holographic diffraction structure 108.

For example, the first portion 178 of the optical system 1000 is made by affixing the first optical guide device 102 onto a transparent substrate 182. Afterwards, a material layer 106.1, similar to the previously-described layer 106 is deposited over the transparent substrate 182 and the first optical guide device 102. A protective layer 126.1, similar to the previously-described layer 126, is deposited over the layer 106.1.

Figure 21:
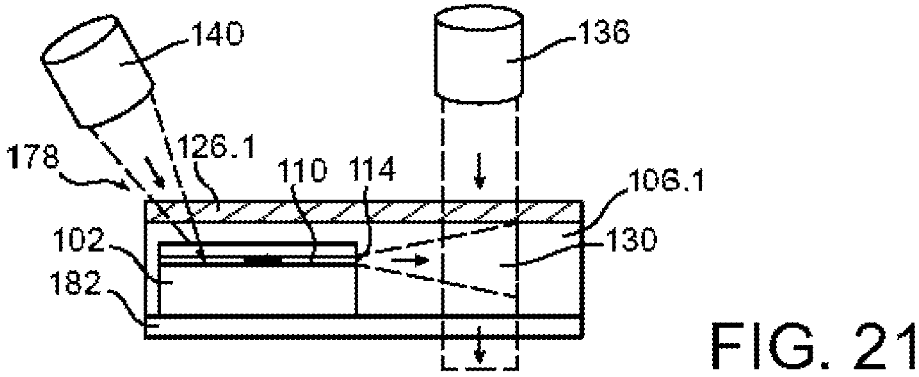
FIG. 21 and FIG. 22 illustrate portions of an embodiment of an optical system, object of the present invention, comprising an optical coupling device, also object of the present invention, according to the third embodiment.

The first portion 178 of the optical system 1000 is shown alone in FIG. 21, during making of the first region 130 of the holographic diffraction structure 108. The first region 130 according to this third embodiment is made in a manner similar to the first region 130 previously described for the second embodiment.

Concomitantly with making of the first portion 178 of the optical system 1000, the second portion 180 of the optical system 1000 is made. Like in the embodiment previously described in connection with the second embodiment, the second optical guide device 104 includes for example at least one optical guide 118 integrated to a substrate 109. Etching of the substrate 109 is implemented to form a cavity. Afterwards, a material layer 106.2, similar to the previously-described layer 106, is deposited over the substrate 109, and in particular in the cavity etched in the substrate 109. A protective layer 126.2, similar to the previously-described layer 126, is deposited over the layer 106.2.

Figure 22:
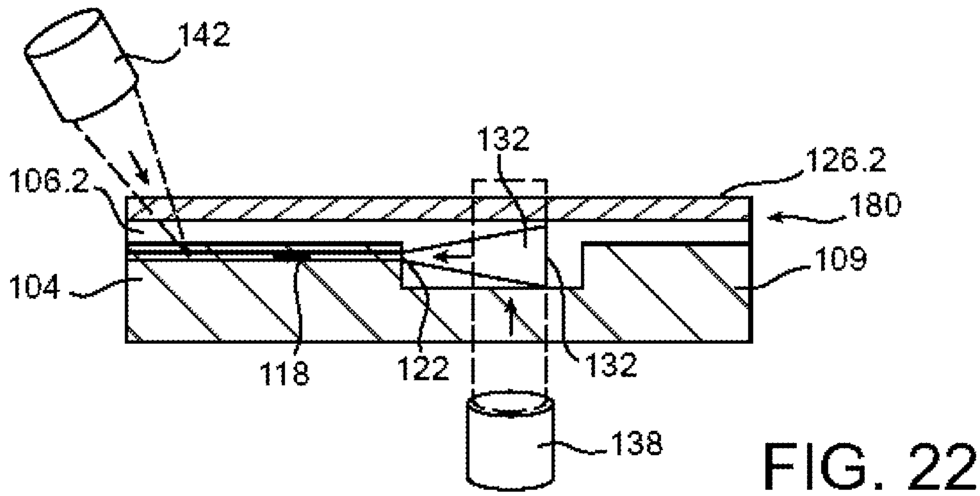

The second portion 180 of the optical system 1000 is shown alone in FIG. 22, when making the second region 132 of the holographic diffraction structure 108. The second region 132 according to this third embodiment is made in a manner similar to the second region 132 previously described for the second embodiment. Hence, like in the second embodiment, the substrate 109 is at least partially transparent or includes blind holes 176 like in the example previously described with reference to FIG. 19.

At the end of these steps, the two portions 178, 180 of the optical system 1000 are obtained in the form of two modules which could be connected by an identical reference light beam. These two modules are assembled through an unconstrained step of alignment of these modules, and securing the two modules together, for example by a bonding layer 184. For example, if the size of the reference beam is 100 μm at the first and second regions 130, 132, the modules may be positioned within a few micrometers with respect to respective predetermined positions, during the alignment step.

One advantage of this third embodiment is that the two portions 178, 180 of the optical system 1000 could be made separately, which could simplify making of the holographic diffraction structure 108, in particular the management of the couplings of the light signals for making the structure 108, for example when the first device 102 is positioned above the optical guide 118. This also allows avoiding a double insolation of the holographic material when the holographic diffraction structure 108 includes two distinct regions formed in the same layer 106 as previously described in the second embodiment.

Advantageously, several optical systems 1000 according to this third embodiment are made collectively using a first substrate for making the first portions 178 and a second substrate for making the second portions 180 of these different optical systems 100. When making the holographic diffraction structures 108 of the optical systems 1000, each of the first and second substrate 109, 182 is moved in order to position, for making of the region of the corresponding holographic diffraction structure 108 of each of the optical systems 1000, the material of the layer 106.1 or 106.2 opposite the light emitter elements used for making the regions 130, 132 of the holographic diffraction structure 108. Thus, a set of holographic diffraction structures 108 may be made, with a good repeatability of the position of these structures which is guaranteed by keeping the used write light beams in position.

At the end of these steps, the first and second substrates are joined together for example thanks to the use of alignment crosses or a mechanical marker at the edge of the wafer, present on both substrate 109, 182. Afterwards, the obtained final assembly is cut into chips to obtain the optical systems 1000.

In the previously-described different examples, the holographic diffraction structure 108 is advantageously made of a photopolymer which is transformed by light beams, which enables making of the structure 108 by self-recording in the photopolymer. Alternatively, it is nonetheless possible to make the holographic diffraction structure 108 otherwise, for example using another material type such as silver halide or DCG ("DiChromated Gelatin" in English). In this case, recording of the diffraction structure will be done using successive baths for processing this material.

In all embodiments, the oxygen-tight material layer(s) covering the material portion(s) including the holographic diffraction structure may be removed after making of the holographic diffraction structure. Finally, a person skilled in the art sees that the write waveguides and the operation waveguides of each guide device do not necessarily consist of parallel optical axes.

The invention claimed is:

1. An optical coupling device configured to optically couple a first optical guide device to a second optical guide device, comprising:

at least one first optical input-output through which the first optical guide device is configured to emit and/or receive a first light beam according to a first direction, a second optical input-output through which the second optical guide device is configured to receive and/or emit the first light beam according to a second direction, at least one holographic diffraction structure including:

a first region representative of first interferences that occur between the first light beam when the latter is emitted in the first optical input-output of the optical coupling device according to the first direction and a second light beam emitted according to a third direction which is not parallel to the first direction and which meets the first light beam in the first region of the holographic diffraction structure; and a second region, distinct from the first region, and representative of second interferences that occur between a third light beam emitted in the second optical input-output of the optical coupling device parallel to the second direction and a fourth light beam, corresponding to a light beam conjugated with the second light beam, emitted according to a fourth direction opposite to the third direction and which meets the third light beam in the second region of the holographic diffraction structure.

2. The optical coupling device according to claim 1, wherein the holographic diffraction structure is formed in one single material portion.

3. The optical coupling device according to claim 2, wherein the material portion including the holographic diffraction structure includes at least one photopolymer or silver halide.

4. The optical coupling device according to claim 1, wherein the first region of the holographic diffraction structure is formed in a first material portion, and the second region of the holographic diffraction structure is formed in a second material portion distinct from the first material portion.

5. The optical coupling device according to claim 4, wherein the first material portion and the second material portion including the holographic diffraction structure include at least one photopolymer or silver halide.

6. The optical system according to claim 5, wherein at least one amongst the first and second optical guide devices includes a light emitter element.

7. An optical system comprising at least:

an optical coupling device according to claim 1;

a first optical guide device configured to emit and/or receive a first light beam and optically coupled to the first optical input-output of the optical coupling device;

a second optical guide device configured to receive and/or emit the first light beam and optically coupled to the second input-output of the optical coupling device.

8. The optical system according to claim 7, wherein:

the first optical guide device comprises two first guide inputs-outputs distinct and optically coupled to the first optical input-output of the optical coupling device;

the second optical guide device comprises two second guide inputs-outputs distinct and optically coupled to the second optical input-output of the optical coupling device.

9. The optical system according to claim 7, wherein:

the first optical guide device corresponds to a photonic circuit;

the second optical guide device includes an optical guide contained in a substrate;

the optical coupling device and the first optical guide device are arranged over the substrate.

10. A method for making an optical system, comprising at least:

making a first optical guide device configured to emit and/or receive a first light beam according to a first direction, making a second optical guide device on a substrate over which the first optical guide device is arranged, the second optical guide device being configured to receive and/or emit the first light beam according to a second direction;

making an optical coupling device including the following steps:

depositing a holographic material layer over at least one region of the substrate at which a holographic diffraction structure is intended to be made;

emitting a first write light beam by the first optical guide device according to the first direction, and a second write light beam according to a third direction which is not parallel to the first direction and which meets the first write light beam in a first region of the holographic diffraction structure which is representative of the interferences produced between the first and second write light beams;

emitting a third write optical beam by the second optical guide device parallel to the second direction, and a fourth write light beam, corresponding to a light beam conjugated with the second write light beam, according to a fourth direction opposite to the third direction and which meets the third write light beam in a second region of the holographic diffraction structure which is representative of the interferences produced between the third and fourth write light beams.

11. The method according to claim 10, wherein the first and second optical guide devices are made such that:

the first optical guide device is arranged over a first substrate able to be crossed by the first light beam and is configured to emit and/or receive the first light beam according to a first direction, and that the second optical guide device is formed in a second substrate able to be crossed by the first light beam and is configured to receive and/or emit the first light beam according to a second direction, wherein the holographic diffraction structure is obtained upon implementation of the following steps:

depositing a first holographic material layer over at least one region of the first substrate at which a first region of the holographic diffraction structure is intended to be made, then emitting a first write light beam by the first optical guide device according to the first direction, and a second write light beam according to a third direction which is not parallel to the first direction and which meets the first write light beam in the first region of the holographic diffraction structure which is representative of the interferences produced between the first and second write light beams, forming a first portion of the optical system;

depositing a second holographic material layer over at least one region of the second substrate at which a second region of the holographic diffraction structure is intended to be made, then emitting a third write light beam by the second optical guide device parallel to the second direction, and a fourth write light beam, corresponding to a light beam conjugated with the second write light beam, according to a fourth direction opposite to the third direction and which meets the third write light beam in the second region of the holographic diffraction structure which is representative of the interferences produced between the third and fourth write light beams, forming a second portion of the optical system;

assembling the first and second portions of the optical system.

12. The method according to claim 11, further including, between making of the first and second optical guide devices and making of the holographic diffraction structure, a step of aligning and adjusting the write light beams implemented using adjustment light beams preserving the physical properties of the holographic material layer used for making the holographic diffraction structure.

13. The method according to claim 10, further including, between making of the first and second optical guide devices and making of the holographic diffraction structure, a step of aligning and adjusting the write light beams implemented using adjustment light beams preserving the physical properties of the holographic material layer used for making the holographic diffraction structure.

* * * * *